(12) United States Patent
Nguyen et al.

(10) Patent No.: US 10,227,840 B2
(45) Date of Patent: Mar. 12, 2019

(54) COMPOSITE MANDREL FOR USE IN SUBTERRANEAN FORMATION

(71) Applicant: Halliburton Energy Services, Inc., Houston, TX (US)

(72) Inventors: Vinh Nguyen, Houston, TX (US); Brian Vandellyn Park, Spring, TX (US); Jason Edward Therrien, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/573,111

(22) PCT Filed: Jun. 19, 2015

(86) PCT No.: PCT/US2015/036630
§ 371 (c)(1),
(2) Date: Nov. 9, 2017

(87) PCT Pub. No.: WO2016/204780
PCT Pub. Date: Dec. 22, 2016

(65) Prior Publication Data
US 2018/0128076 A1    May 10, 2018

(51) Int. Cl.
| | | |
|---|---|---|
| *E21B 33/12* | (2006.01) | |
| *B33Y 80/00* | (2015.01) | |
| *B29C 33/38* | (2006.01) | |
| *B29C 39/10* | (2006.01) | |
| *E21B 47/01* | (2012.01) | |

(Continued)

(52) U.S. Cl.
CPC ...... *E21B 33/1212* (2013.01); *B29C 33/3842* (2013.01); *B29C 39/10* (2013.01); *B33Y 80/00* (2014.12); *E21B 47/011* (2013.01); *E21B 17/026* (2013.01); *F16L 17/04* (2013.01)

(58) Field of Classification Search
CPC .. E21B 33/1212; E21B 47/011; E21B 17/026; B33Y 80/00; B29C 33/3842; B29C 39/10; F16L 17/04
See application file for complete search history.

(56) References Cited

U.S. PATENT DOCUMENTS

| | | |
|---|---|---|
| 4,319,950 A | 3/1982 | Sznopek et al. |
| 4,522,464 A | 6/1985 | Thompson et al. |

(Continued)

OTHER PUBLICATIONS

International Search Report and Written Opinion of PCT Application No. PCT/US2015/036630 dated Mar. 2, 2016: pp. 1-20.

*Primary Examiner* — Michael C Miggins
(74) *Attorney, Agent, or Firm* — Chamberlain Hrdlicka

(57) ABSTRACT

Various embodiments disclosed relate to a composite mandrel. In various embodiments, the present invention provides a method of forming a composite mandrel for use in a subterranean formation. The method can include securing an elongated mold to at least a portion of an exterior surface of a rigid tubular to form a cavity between the mold and the exterior surface of the rigid tubular. The elongated mold can include a recessed portion. The cavity can extend longitudinally along the tubular. The method can include filling the cavity with a curable resin composition. The method can also include curing the resin to provide a cured resin including a utility recess corresponding to the recessed portion. Curing the curable resin composition can form the composite mandrel including the tubular and the cured resin.

20 Claims, 7 Drawing Sheets

(51) Int. Cl.
*E21B 17/02* (2006.01)
*F16L 17/04* (2006.01)

(56) References Cited

U.S. PATENT DOCUMENTS

| | | |
|---|---|---|
| 6,915,686 B2 | 7/2005 | Baustad |
| 7,324,730 B2 | 1/2008 | Varkey et al. |
| 2006/0131780 A1 | 6/2006 | Kuno et al. |
| 2008/0217063 A1 | 9/2008 | Moore et al. |
| 2011/0290477 A1 | 12/2011 | Jääskeläinen |
| 2014/0261847 A1 | 9/2014 | Molina |

COMPOSITE MANDREL FOR USE IN SUBTERRANEAN FORMATION

BACKGROUND

In the oil and gas industry, mandrels are specialized tubular components that can protect various equipment or instrumentation in a subterranean formation, such as cable splices, cable terminations, gauges and sensors, or other instrumentation. Mandrels are generally made using an expensive and time-consuming procedure that includes machining them from a single piece and rigorous pressure testing, making customization of design difficult and resulting in long delivery times.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
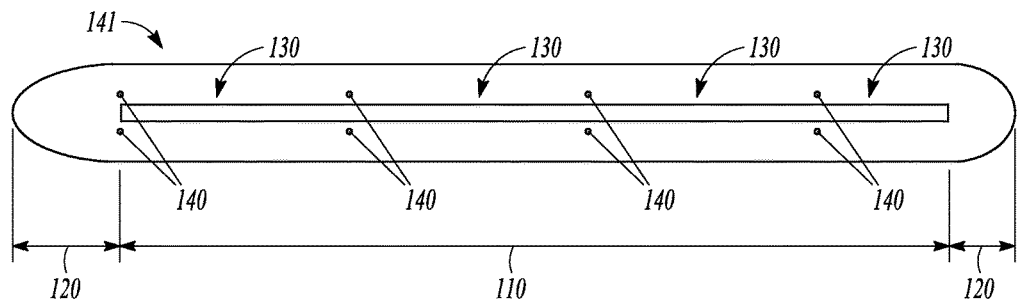
FIG. 1 is an illustration of a mold for making a composite mandrel, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

In this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. A comma can be used as a delimiter or digit group separator to the left or right of a decimal mark; for example, "0.000,1" is equivalent to "0.0001."

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "organic group" as used herein refers to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms) or a carbon-based moiety, and wherein the carbon-based moiety can itself be substituted or unsubstituted.

The term "substituted" as used herein in conjunction with a molecule or an organic group as defined herein refers to the state in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "acyl" as used herein refers to a group containing a carbonyl moiety wherein the group is bonded via the carbonyl carbon atom. The carbonyl carbon atom is bonded to a hydrogen forming a "formyl" group or is bonded to another carbon atom, which can be part of an alkyl, aryl, aralkyl cycloalkyl, cycloalkylalkyl, heterocyclyl, heterocylylalkyl, heteroaryl, heteroarylalkyl group or the like. An acyl group can include 0 to about 12, 0 to about 20, or 0 to about 40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbon groups that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "heterocyclyl" as used herein refers to aromatic and non-aromatic ring compounds containing three or more ring members, of which one or more is a heteroatom such as, but not limited to, N, O, and S.

The term "amine" as used herein refers to primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —NH$_2$, —NHR, —NR$_2$, —NR$_3^+$, wherein each R is independently selected, and protonated forms of each, except for —NR$_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "hydrocarbon" or "hydrocarbyl" as used herein refers to a molecule or functional group, respectively, that includes carbon and hydrogen atoms. The term can also refer to a molecule or functional group that normally includes both carbon and hydrogen atoms but wherein all the hydrogen atoms are substituted with other functional groups. A hydrocarbyl group can be a functional group derived from a straight chain, branched, or cyclic hydrocarbon, and can be alkyl, alkenyl, alkynyl, aryl, cycloalkyl, acyl, or any combination thereof. Hydrocarbyl groups can be shown as $(C_a-C_b)$hydrocarbyl, wherein a and b are positive integers and mean having any of a to b number of carbon atoms. For example, $(C_1-C_4)$hydrocarbyl means the hydrocarbyl group can be methyl ($C_1$), ethyl ($C_2$), propyl ($C_3$), or butyl ($C_4$), and $(C_0-C_b)$hydrocarbyl means in certain embodiments there is no hydrocarbyl group.

The term "solvent" as used herein refers to a liquid that can dissolve a solid, liquid, or gas. Non-limiting examples of solvents are silicones, organic compounds, water, alcohols, ionic liquids, and supercritical fluids.

The term "room temperature" as used herein refers to a temperature of about 15° C. to 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2-C_{40}$ fatty acid $C_1-C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product or fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

In various embodiments, the present invention provides a method of forming a composite mandrel for use in a subterranean formation. The method includes securing an elongated mold to at least a portion of an exterior surface of a rigid tubular to form a cavity between the mold and the exterior surface of the rigid tubular. The elongated mold includes a recessed portion. The cavity extends longitudinally along the tubular. The method includes filling the cavity with a curable resin composition. The method includes curing the curable resin composition to provide a cured resin including a utility recess corresponding to the recessed portion. Curing the curable resin composition forms the composite mandrel including the tubular and the cured resin.

In various embodiments, the present invention provides a method of forming a composite mandrel for use in a subterranean formation. The method includes forming an elongated mold including a recessed portion, with the forming including three dimensional (3D)-printing. The method includes securing the elongated mold to at least a portion of an exterior surface of a rigid tubular to form a cavity between the mold and the exterior surface of the rigid tubular. The cavity extends longitudinally along the tubular and includes a midsection and two tapered longitudinal ends. A length of the cavity is about 5 to 20 times a width of the midsection of the cavity. A width of the midsection of the cavity is about 10% to about 40% of a circumference of the tubular. The method includes filling the cavity with a curable resin composition. The method also includes curing the curable resin composition to provide a cured resin including a utility recess corresponding to the recessed portion. Curing the curable resin composition forms the composite mandrel including the tubular and the cured resin. The utility recess is sufficient to accommodate a cable splice, a cable splice housing, a cable termination, a cable termination housing, instrumentation, or a combination thereof.

In various embodiments, the present invention provides a composite mandrel. The composite mandrel includes a rigid tubular. The composite mandrel also includes a cured resin bonded to at least a portion of the rigid tubular. The cured resin is elongated and extends longitudinally along the tubular. The cured resin includes a utility recess sufficient to accommodate a cable splice, a cable splice housing, a cable termination, a cable termination housing, instrumentation, or a combination thereof.

In various embodiments, the present invention provides a system. The system includes a composite mandrel disposed in a subterranean formation. The composite mandrel includes a rigid tubular. The composite mandrel also includes a cured resin bonded to the rigid tubular. The cured resin is elongated and extends longitudinally along the tubular. The cured resin includes a utility recess. The system also includes a cable splice, a cable splice housing, a cable termination, a cable termination housing, instrumentation, or a combination thereof, disposed within the utility recess.

In various embodiments, the method can provide the composite mandrel with lower lead times than other methods of making mandrels, thereby removing the mandrel as a choke point in project completion. In various embodiments, the method can provide the composite mandrel at a lower production cost than other methods of making mandrels. In various embodiments, the method can provide the composite mandrel without pressure testing, due to the incorporation of a tubular designed for subterranean use in the composite mandrel.

In various embodiments, the method can provide the composite mandrel without the use of ovens or special equipment. In various embodiments, the composite mandrel can be formed using a curable resin composition that can cure at ambient temperature anywhere that the tubular-resin composite can be left to cure. In various embodiments, the mold for the mandrel can be formed using a convenient process such as 3D-printing, thereby allowing rapid formation of the mold at low cost. In various embodiments, the method can easily be adapted to different diameters of tubular.

In various embodiments, the composite mandrel can be more resistant than other mandrels to harsh conditions found downhole, such as high temperatures and high pressures. In various embodiments, the composite mandrel can be more abrasion and impact resistant than other mandrels. In various embodiments, the composite mandrel can be more resistant to hydrogen sulfide ($H_2S$) than other mandrels. In various embodiments, the composite mandrel can be more resistant to harsh chemical environments than other mandrels. In various embodiments, the composite mandrel can cause minimal or no increased stiffness in the tubular used to form the composite mandrel. In various embodiments, the composite mandrel can have a decreased drag coefficient while running downhole as compared to other mandrels.

Method of Forming a Composite Mandrel.

Various embodiments provide a method of forming a composite mandrel. The composite mandrel can be used in a subterranean formation.

The method can include securing an elongated mold to at least a portion of an exterior surface of a rigid tubular to form a cavity between (e.g., defined by) the interior of the mold and the exterior surface of the rigid tubular. The length of the mold can extend longitudinally along the rigid tubular, such that the longitudinal axis of the mold and the tubular are approximately parallel. The rigid tubular can be any suitable rigid tubular for use in a subterranean formation, such as a drill pipe, a casing, a production tubing, or a combination thereof. The rigid tubular can include some flexibility, but is sufficiently rigid for the intended use of the tubular (e.g., drilling, casing, production, and the like). The tubular can have substantially constant circumference, or can have a varying circumference. The tubular can have a substantially constant circumference over the section of the tubular that is contacted with the mold.

The exterior surface of the tubular contacted with the mold can include an area of increased roughness. The increased roughness can allow the cured resin to bond more securely with the tubular. In some embodiments, the method includes roughening the exterior surface of the tubular before contacting the exterior surface of the tubular with the mold, while in other embodiments, the tubular is roughened prior to performance of the method. Any suitable process can be used to roughen the exterior surface of the tubular. The method can include sand blasting the exterior surface of the tubular before securing the mold to the exterior surface of the tubular.

The mold can be any suitable mold, having any suitable elongated shape, and made of any suitable material, such that the method can be carried out as described herein. The mold can include a polymer, a metal, and combinations thereof. The mold can be formed from transparent material, semi-transparent material, or opaque material. The mold can be formed for UV-curable material, such that a liquid material can be placed (e.g., 3D-printed) and UV-light can be used to cure it to a solid form. The mold can be formed from material that is thermoplastic, thermosetting, or a combination thereof. The cured mold can be flexible or rigid. The mold can be machined after it is formed, such as to refine or add shapes, patterns, or contours on the mold.

In some embodiments, the mold is formed prior to performing the method. In some embodiments, the method includes forming the mold before securing the mold to the exterior surface of the tubular. The mold can be formed in a rapid and convenient manner that allows fast manufacture of various designs of the composite mandrel. In some embodiments, the mold can be 3D-printed, extruded, cast (e.g., investment casting), or vacuum-formed. The mold can be durable, such that more than one composite mandrel can be formed with the method described herein using the same mold.

In some embodiments, the mold can be formed from multiple sections of material, such as multiple sections of 3D-printed material, which can be secured together before or during the securing of the mold on the exterior surface of the tubular. The mold can include one or more filling holes, for injection of the curable resin composition. The mold can include one or more breather holes, that allow air to escape as the curable resin is injected into the cavity.

Securing the mold on the exterior surface of the tubular can include securing the mold to the exterior surface of the tubular. The mold can be secured to the tubular in any suitable manner. Securing the mold can include strapping or taping the mold to the exterior surface of the tubular.

Securing the elongated mold to the exterior surface of the rigid tubular forms a cavity between the mold and the exterior surface of the rigid tubular, defined by the inner surface of the mold and the exterior surface of the rigid tubular in contact with the mold. The cavity can extend longitudinally along the tubular. The cavity formed between the mold and the exterior surface of the rigid tubular corresponds to the shape of the cured resin-component of the composite mandrel formed by the method. Features on the inner surface of the mold (e.g., the surface that faces the exterior surface of the rigid tubular when the mold and the tubular are in contact and secured together) are transferred to the cured resin and become features in the composite mandrel.

The method can include filling the cavity with a curable resin composition. The mold can include one or more orifices between the cavity and the environment external to the cavity for filling the cavity with the curable resin composition. The cavity can be filled with the curable resin composition by injecting the curable resin composition into the cavity at any suitable temperature and pressure, such as about ambient temperature, or such as about 0° C. to about 500° C., about 10° C. to about 250° C., or about 0° C. or less, or about 10° C., 20, 30, 40, 50, 60, 80, 100, 120, 140, 160, 180, 200, 220, 240, 260, 280, 300, 350, 400, 450° C., or about 500° C. or more, and such as about ambient pressure, or such as about 100 kPa to about 10,000 kPa, or about 100 kPa to about 1,000 kPa, or about 100 kPa or less, or about 110 kPa, 120, 130, 140, 150, 160, 180, 200, 220, 240, 260, 300, 350, 400, 450, 500, 750, 1,000, 2,500, 5,000, 7,500, or about 10,000 kPa or more.

The method can also include curing the curable resin composition to provide a cured resin including a utility recess corresponding to the recessed portion. Curing the curable resin forms the composite mandrel including the tubular and the cured resin. The curing can include causing a chemical reaction to occur that solidifies the curable resin, such as crosslinking or polymerization (e.g., with thermosetting curable resins). The curing can include allowing a flowable curable resin to cool to solidify and thereby cure (e.g., with thermoplastic resins).

Curing can be performed at any suitable temperature and pressure and for any suitable length of time. In some embodiments, curing can be performed at ambient temperature and pressure (e.g., overnight, or for about a day). The curing can be a non-ultra violet (UV) cure, wherein UV-light is not needed to cure the curable resin composition. In some embodiments, curing can be performed at about 0° C. to about 500° C., about 10° C. to about 250° C., or about 0° C. or less, or about 10° C., 20, 30, 40, 50, 60, 80, 100, 120, 140, 160, 180, 200, 220, 240, 260, 280, 300, 350, 400, 450° C., or about 500° C. or more. In some embodiments, curing can be performed at about 100 kPa to about 10,000 kPa, or about 100 kPa to about 1,000 kPa, or about 100 kPa or less, or about 110 kPa, 120, 130, 140, 150, 160, 180, 200, 220, 240, 260, 300, 350, 400, 450, 500, 750, 1,000, 2,500, 5,000, 7,500, or about 10,000 kPa or more. In some embodiments, curing can be performed for 1 minutes to about 7 days, or about 10 minutes to about 5 days, or about 1 minute or less, or about 2 minutes, 3, 4, 5, 6, 8, 10, 12, 14, 16, 18, 20, 25, 30, 35, 40, 45, 50, 55 minute, 1 hour, 1.5 minutes, 2, 2.5, 3, 4, 5, 6, 8, 10, 12, 14, 16, 18, 20, 22 hours, 1 day, 1.5 days, 2, 2.5, 3, 3.5, 4, 4.5, 5, 6 days, or about 7 days or more. The curing can be performed until the cured resin reaches a predetermined hardness. For example, the curing can be performed until the cured resin reaches a hardness of about 50 to about 500 Durometer, or about 80 to about 250 Durometer, or about 50 Durometer or less, or about 60 Durometer, 70, 80, 90, 100, 120, 140, 160, 180, 200, 220, 240, 260, 280, 300, 350, 400, 450, or about 500 Durometer or more. At the conclusion of the curing, the method can include removing the mold from the exterior surface of the tubular.

The cured resin can be bonded to the tubular with or without the use of fastening devices. In some embodiments, the method includes machining or otherwise shaping the cured resin after completion of the curing, such as to refine or add features in the cured resin, such as pockets, flat surfaces, undercuts, channels, bypass cutouts, or combinations thereof.

Utility Recess.

In various embodiments, the elongated mold can include a recessed portion. The recessed portion can be a portion of the interior of the mold that extends toward the exterior surface of the tubular, preventing the resin from filling the area occupied by the recessed portion, such that in the cured resin a utility recess that is recessed from the outer surface of the mandrel is formed (e.g., a hollow or indented area in the cured resin). The recessed portion in the mold can be an indentation in the mold (e.g., a slot, pocket, hole, compartment, or other suitable indentation) that provides a corresponding utility recess in the cured resin of the composite mandrel (e.g., a slot, pocket, hole, compartment, or other suitable space), for accommodating and protecting various downhole equipment and instrumentation. The composite mandrel can be used to accommodate and protect any suitable downhole equipment or instrumentation, or any combination thereof. In some embodiments, the utility recess can be sufficient to accommodate (e.g., protect downhole) a cable splice, a cable splice housing, a cable termination, a cable termination housing, instrumentation, or a combination thereof. The utility recess can be sufficient to accommodate (e.g., and protect downhole) a fiber optic splice, a fiber optic splice housing, a fiber optic end termination, a racetrack splice, an in-line splice, a pressure gauge or sensor, a temperature gauge or sensor, a composition analyzer, a sound detector, nuclear magnetic resonance (NMR) equipment, or a combination thereof.

The cured resin can include one or more access orifices, such as an orifice leading from the utility recess to space exterior to the mandrel (e.g., for fiber optic cables or wires), an orifice leading from interior space of the tubular to the utility recess (e.g., for a pressure sensor for monitoring pressure inside casing), or a combination thereof. The access orifices can provide pathways for various cables or other equipment to pass through the cured resin to reach the utility recess or to reach the interior of the tubular.

Cavity and Cured Resin.

Securing the elongated mold to the exterior surface of the rigid tubular forms a cavity between the mold and the exterior surface of the rigid tubular. The cavity can extend longitudinally along the tubular. The cavity formed between the mold and the exterior surface of the rigid tubular corresponds to the shape of the cured resin-component of the composite mandrel formed by the method. Features on the inner surface of the mold (e.g., the surface that faces the exterior surface of the rigid tubular when the mold and the tubular are in contact) are transferred to the cured resin and become features in the composite mandrel. The cavity formed by securing the elongated mold to the exterior surface of the rigid tubular can be a single contiguous cavity, such that flowable curable resin injected into one portion of the cavity can flow to all portions of the cavity. Features of the cavity described herein are to be understood as having corresponding features in the cured resin, and likewise features of the cured resin described herein are to be understood as having corresponding features in the cavity.

The cavity can be substantially longitudinally symmetric along a line that is perpendicular to a central axis of the tubular. The cavity can be substantially laterally symmetric along a line that is parallel to a central axis of the tubular.

The cavity can include a midsection and two tapered longitudinal ends. The midsection can include at least part of the utility recess. The midsection can be substantially free of tapering of width (e.g., thickness can be tapered to the exterior surface of the rigid tubular at the edges of the entire cavity). The lateral center of the midsection can be substantially free of tapering of thickness. The longitudinal ends of the cavity can have a tapered thickness (e.g., a thickness that tapers to the exterior surface of the tubular). The longitudinal ends of the cavity can have a tapered width (e.g., tapered to a lateral center, or to a line about which the cavity is substantially laterally symmetric).

FIG. 1 illustrates a top view of a mold 101. The mold includes a midsection 110 and two tapered longitudinal ends 120. The mold includes a recessed portion 130. The mold includes threaded inserts 140, which can be transferred to the cured resin and used to fasten retaining covers (e.g., metal retaining covers) or other structures (e.g., sensors, cables, splice housing, end-termination housing, racetrack housing, clamp-on sensor (e.g., a clamp-on transducer, such as for clamping onto a fiber sensor), pass-through channel, splitters, burst disk) to the cured resin.

The elongated cavity can have any suitable length to width ratio. For example, the length of the cavity can be about 2 to about 1,000 times a width of the midsection of the cavity (e.g., the width as measured at the longitudinal center of the cavity, or an average width of the midsection), or about 5 to about 20 times a width of the midsection of the cavity, or about 2 or less, or about 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 30, 35, 40, 45, 50, 60, 70, 80, 90, 100, 250, 500, 750, or about 1,000 or more times a width of the midsection of the cavity. The elongated cavity can have any suitable length to thickness ratio. For example, the length of the cavity can be about 2 to about 1,000 times a thickness of the midsection of the cavity (e.g., a thickness as measured along the lateral center of the midsection, or an average thickness of the midsection as measured along the lateral center of the cavity), about 10 to about 30 times a thickness of the midsection of the cavity, or about 2 or less, or about 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 30, 35, 40, 45, 50, 60, 70, 80, 90, 100, 250, 500, 750, or about 1,000 or more times a thickness of the midsection of the cavity. The width of the midsection of the cavity (e.g., the width as measured at the longitudinal center of the cavity, or an average width of the midsection) can be any suitable proportion of the total circumference of the tubular, such as about 1% to about 50% of the circumference, about 10% to about 40%, or about 1% or less, or about 2%, 4, 6, 8, 10, 12, 14, 16, 18, 20, 25, 30, 35, 40, 45%, or about 50% or more.

Curable Resin Composition.

The method of making the composite mandrel can include filling the cavity with a curable resin composition and subsequently curing the curable resin composition to form a cured resin. The composite mandrel includes the rigid tubular and the cured resin.

The curable resin composition can include any suitable curable resin. The curable resin composition can include one type of curable resin or multiple types of curable resin. Any suitable proportion of the curable resin composition can be the one or more curable resins, such as about 30 wt % to about 100 wt %, or about 50 wt % to about 95 wt %, or about 30 wt % or less, or about 35 wt %, 40, 45, 50, 55, 60, 65, 70, 75, 80, 85, 90, 95, 96, 97, 98, 99 wt %, or about 100 wt %. The curable resin composition can include a thermosetting resin, a thermoplastic resin, or a combination thereof. The curable resin composition can include at least one of an alkyd resin (e.g., polyester), a urea/aldehyde resin (e.g., urea/formaldehyde), a melamine/aldehyde resin (e.g., melamine/formaldehyde), a phenolic resin, a novolac resin, a resol resin, an epoxy resin, a polyimide resin (e.g., including a polyimide, curable to form a polyimide, or both), a polyurethane resin (e.g., including a polyurethane, curable to form a polyurethane, or both), a silicone resin (e.g., including a silicone, curable to form a silicone, or both), a furan-based resin, a polyamide resin (e.g., including a polyamide, curable to forma a polyamide, or both), a polycarbonate resin (e.g., including a polycarbonate, curable to form a polycarbonate, or both), and a polycarbamate resin (e.g., including a polycarbamate, curable to form a polycarbamate, or both).

In some embodiments, the curable resin composition can include at least one of bisphenol A diglycidyl ether resin, butoxymethyl butyl glycidyl ether resin, bisphenol A-epichlorohydrin resin, and bisphenol F resin. In some embodiments, the curable resin composition can include at least one of an acrylic acid polymer, an acrylic acid ester polymer, an acrylic acid homopolymer, an acrylic acid ester homopolymer, poly(methyl acrylate), poly(butyl acrylate), poly(2-ethylhexyl acrylate), an acrylic acid ester copolymer, a methacrylic acid derivative polymer, a methacrylic acid homopolymer, a methacrylic acid ester homopolymer, poly (methyl methacrylate), poly(butyl methacrylate), poly(2-ethylhexyl methacrylate), an acrylamidomethylpropane sulfonate polymer or copolymer or derivative thereof, and an acrylic acid/acrylamidomethylpropane sulfonate copolymer. In some embodiments, the curable resin composition can include at least one of a trimer acid, a fatty acid, a fatty acid-derivative, maleic anhydride, acrylic acid, a polyester, a polycarbonate, a polycarbamate, an aldehyde, formaldehyde, a dialdehyde, glutaraldehyde, a hemiacetal, an aldehyde-releasing compound, a diacid halide, a dihalide, a dichloride, a dibromide, a polyacid anhydride, citric acid, an epoxide, furfuraldehyde, an aldehyde condensate, a silyl-modified polyamide, and a condensation reaction product of a polyacid and a polyamine.

In some embodiments, the curable resin composition includes a curing agent. The curing agent can be any suitable material that induces or participates in curing. In some embodiments, the curing agent can be an amine-functional curing agent. Any suitable proportion of the curable resin composition can be the one or more curing agents, such as about 0.001 wt % to about 50 wt %, or about 0.1 wt % to about 20 wt %, or about 0.001 wt % or less, 0.01, 0.1, 1, 2, 3, 4, 5, 10, 15, 20, 25, 30, 35, 40, 45, or about 50 wt % or more. For example, the curing agent can be an amine, an aromatic amine, an aliphatic amine, a cyclo-aliphatic amine, polyamines, amides, polyamides, a polyethyleneimine, piperidine, triethylamine, benzyldimethylamine, N,N-dimethylaminopyridine, 2-(N,N-dimethylaminomethyl)phenol, tris (dimethylaminomethyl)phenol, N-2-(aminoethyl)-3-aminopropyltrimethoxysilane, 3-glycidoxypropyltrimethoxysilane, n-beta-(aminoethyl)- gamma-aminopropyl trimethoxysilane, n-beta-(aminoethyl)-gamma-aminopropyl trimethoxysilane, piperazine, derivatives of piperazine (e.g., aminoethylpiperazine), pyrrole, imidazole, pyrazole, pyridine, pyrazine, pyrimidine, pyridazine, indolizine, isoindole, indole, indazole, purine, quinolizine, quinoline, isoquinoline, phthalazine, naphthyridine, quinoxaline, quinazoline, carbazole, carbazole, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, azepine, 1,3,5-triazine, thiazole, pteridine, dihydroquinoline, hexamethyleneimine, indazole, 2-ethyl-4-methyl imidazole, 1,1,3-trichlorotrifluoroacetone, and combinations thereof. In various embodiments, the curing agent can be hexamethylenetriamine (HMTA). In some embodiments, the curable resin and the curing agent can be combined shortly prior to placing the curable resin composition in the cavity to avoid premature curing.

In various embodiments, the curable resin composition includes a novolac resin having the following structure:

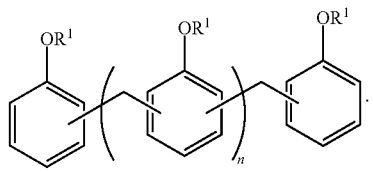

At each occurrence, the phenyl groups shown in the structure are independently further substituted or unsubstituted. At each occurrence, $R^1$ is independently selected from the group consisting of —H, -L-OH,

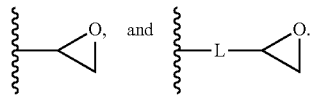

At each occurrence, L is independently a substituted or unsubstituted $(C_0-C_{50})$hydrocarbylene optionally interrupted by 0, 1, 2, or 3 groups chosen from —S—, —O—, substituted or unsubstituted —NH—, —(CH$_2$—O)$_m$—, and (—CH$_2$—CH$_2$—O)$_m$, wherein m is about 1 to about 1,000. The variable n is about 0 to about 1,000,000, such as about 0, 1, 2, 3, 4, 5, 6, 7, 8, 9, 10, 12, 14, 16, 18, 20, 25, 30, 35, 40, 45, 50, 75, 100, 125, 150, 175, 200, 225, 250, 500, 750, 1,000, 2,000, 5,000, 10,000, 20,000, 50,000, 100,000, 500, 000, or about 1,000,000 or more. In some embodiments, the phenyl groups can be unsubstituted (other than the —OR$^1$ groups and methylene bridges). At each occurrence, the variable L can be independently a $(C_1-C_{10})$alkylene.

The curable resin composition can include any one or more suitable optional components. Any optional component can be either present or not present in the curable resin composition. For example, the curable resin composition can include a carrier fluid, a zeolite, a set retarding additive, a corrosion inhibitor, a surfactant, a gas, an accelerator, a weight reducing additive, a dispersant, a crystalline silica compound, an amorphous silica, a fiber, a thixotropic additive, water, a base, an acid, an alcohol or polyol, a cellulose, a starch, an alkalinity control agent, an acidity control agent, a density control agent, a density modifier, an emulsifier, a polymeric stabilizer, a crosslinking agent, a polyacrylamide, a polymer or combination of polymers, an antioxidant, a heat stabilizer, a foam control agent, a diluent, a plasticizer, a filler or inorganic particle, a pigment, a dye, a precipitating agent, a rheology modifier, or a combination thereof. Any one of the preceding can form any suitable proportion of the curable resin composition, such as about 0.001 wt % to about 50 wt %, or about 0.01 wt % to about 20 wt %, or about 0.001 wt % or less, or about 0.01 wt %, 0.1, 1, 2, 3, 4, 5, 6, 8, 10, 12, 14, 16, 18, 20, 25, 30, 35, 40, 45, or about 50 wt % or more.

In various embodiments, the curable resin composition includes a ceramic. The curable resin can include one ceramic or more than one ceramic. The ceramic can be in the form of particles, such as microparticles having a particle size (e.g., a largest dimension) of about 1 micron to about 500 microns, or about 1 micron to about 100 microns. The one or more ceramics can form any suitable proportion of the curable resin composition, such as about 0.001 wt % to about 30 wt %, about 1 wt % to about 10 wt %, or about 0.001 wt % or less, or about 0.01 wt %, 0.1, 1, 2, 3, 4, 5, 6, 8, 10, 12, 14, 16, 18, 20, 25 wt %, or about 30 wt % or more.

In various embodiments, the curable resin composition includes carbon fibers. The carbon fibers can form any suitable proportion of the curable resin composition, such as about 0.001 wt % to about 30 wt %, about 1 wt % to about 10 wt %, or about 0.001 wt % or less, or about 0.01 wt %, 0.1, 1, 2, 3, 4, 5, 6, 8, 10, 12, 14, 16, 18, 20, 25 wt %, or about 30 wt % or more.

In various embodiments, the curable resin composition includes a metal. The metal can be any one or more suitable metals. The metal can be in any suitable form, such as particles or fibers. In some embodiments, the metal can be titanium. The one or more metals can form any suitable proportion of the curable resin composition, such as about 0.001 wt % to about 30 wt %, about 1 wt % to about 10 wt %, or about 0.001 wt % or less, or about 0.01 wt %, 0.1, 1, 2, 3, 4, 5, 6, 8, 10, 12, 14, 16, 18, 20, 25 wt %, or about 30 wt % or more.

In some embodiments, the curable resin composition can include a blend of ceramic and carbon fibers. In some embodiments, the curable resin composition includes a blend of ceramic, carbon fibers, and titanium. In some embodiments, the curable resin composition can include an epoxy resin, ceramic, carbon fibers, and titanium.

Composite Mandrel.

In various embodiments, the present invention provides a composite mandrel for use in a subterranean formation. The composite mandrel can be any composite mandrel that can be formed using an embodiment of the method of making a composite mandrel described herein. For example, the composite mandrel can include a rigid tubular. The composite mandrel can include a cured resin bonded to the rigid tubular. The shape of the cured resin can correspond to the cavity described herein formed between the exterior surface of the tubular and the mold. The cured resin can be elongated and can extend longitudinally along the tubular. The cured resin can include a utility recess. The utility recess can be sufficient to accommodate a cable splice, a cable splice housing, a cable termination, a cable termination housing, instrumentation, or a combination thereof. The composite mandrel can include one or more plates or fasteners thereon. In some embodiments, the plates or fasteners can be used to enclose cables, equipment, or instrumentation in the utility recess of the composite mandrel.

Figure 2:
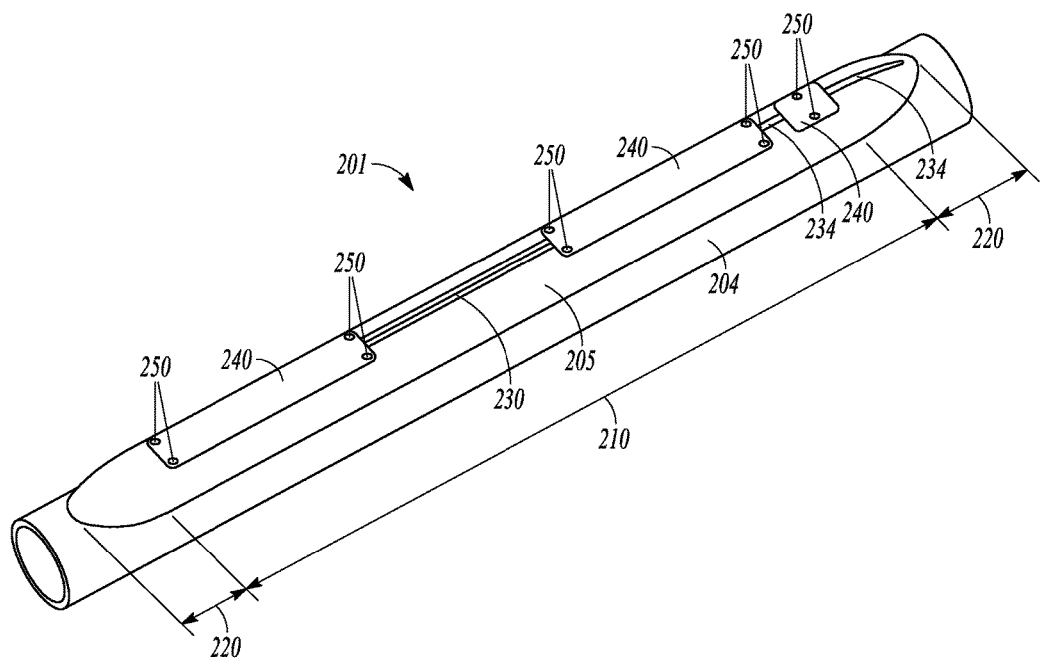
FIG. 2 is an illustration of a composite mandrel, in accordance with various embodiments.

FIG. 2 illustrates a composite mandrel 201. The composite mandrel includes rigid tubular 204 and cured resin 205. The cured resin 205 is bonded to the rigid tubular 204. The cured resin 205 includes a midsection 210 and two tapered longitudinal ends 220. The cured resin includes utility recess 230. The composite mandrel includes metal retaining covers 240 affixed to the cured resin via fasteners 250. In various embodiments, the fasteners 250 can attach to the cured resin 205 via threaded inserts in the cured resin, or via threads made directly in the cured resin.

In various embodiments, the present invention provides a method of treating a subterranean formation, with the method including placing the composite mandrel in the subterranean formation.

System or Apparatus.

In various embodiments, the present invention provides a system or apparatus. The system or apparatus can be any system or apparatus that includes a composite mandrel that can be formed using an embodiment of the method of making a composite mandrel described herein.

In various embodiments, the present invention provides a system. The system includes a composite mandrel disposed in a subterranean formation. The composite mandrel includes a rigid tubular. The composite mandrel also includes a cured resin bonded to the rigid tubular. The cured resin is elongated and extends longitudinally along the tubular. The cured resin includes a utility recess. The system also includes a cable splice, a cable splice housing, a cable termination, a cable termination housing, instrumentation, or a combination thereof, disposed within the utility recess. In some embodiments, the system also includes a pump fluidly coupled to the tubular and configured to pump a composition through the tubular in the subterranean formation.

In various embodiments, the present invention provides an apparatus. The apparatus includes a composite mandrel disposed in a subterranean formation. The composite mandrel includes a rigid tubular. The composite mandrel also includes a cured resin bonded to the rigid tubular. The cured resin is elongated and extends longitudinally along the tubular. The cured resin includes a utility recess. The apparatus also includes a cable splice, a cable splice housing, a cable termination, a cable termination housing, instrumentation, or a combination thereof, disposed within the utility recess.

In some embodiments, the system can include a drill string disposed in a wellbore, with the drill string including a drill bit at a downhole end of the drill string. The system can also include an annulus between the drill string and the wellbore. The system can also include a pump configured to circulate a composition through the drill string (including the mandrel), through the drill bit, and back above-surface through the annulus. In some embodiments, the system can include a fluid processing unit configured to process the composition exiting the annulus to generate a cleaned drilling fluid for recirculation through the wellbore.

The pump can be a high pressure pump in some embodiments. As used herein, the term "high pressure pump" will refer to a pump that is capable of delivering a fluid to a subterranean formation (e.g., downhole) at a pressure of about 1000 psi or greater. A high pressure pump can be used when it is desired to introduce a composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey a composition to the high pressure pump. In such embodiments, the low pressure pump can "step up" the pressure of a composition before it reaches the high pressure pump.

Figure 3:
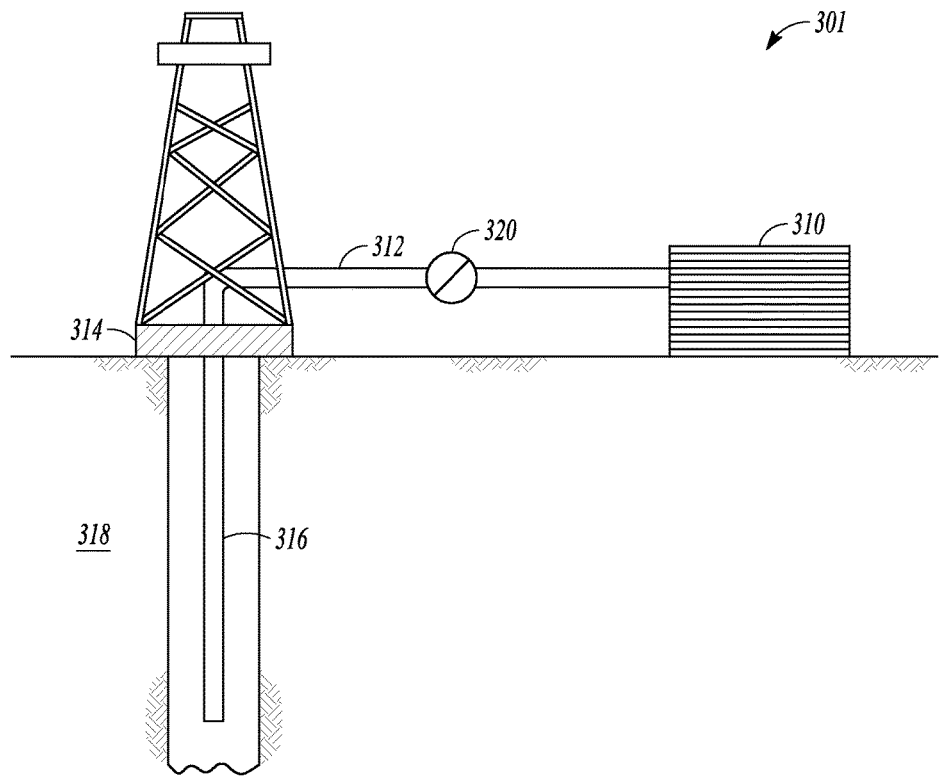
FIG. 3 is an illustration of a system or apparatus including a composite mandrel, in accordance with various embodiments.

FIG. 3 shows an illustrative schematic of systems and apparatuses. It should be noted that while FIG. 3 generally depicts a land-based system or apparatus, it is to be recognized that like systems and apparatuses can be operated in subsea locations as well. Embodiments of the present invention can have a different scale than that depicted in FIG. 3. As depicted in FIG. 3, system or apparatus 301 can include mixing tank 310. A composition can be conveyed via line 312 to wellhead 314, where the composition enters tubular 316, with tubular 316 extending from wellhead 314 into subterranean formation 318. Tubular 316 can include the composite mandrel (not shown). Upon being ejected from tubular 316, the composition can subsequently penetrate into subterranean formation 318. Pump 320 can be configured to raise the pressure of the composition to a desired degree before its introduction into tubular 316. It is to be recognized that system or apparatus 301 is merely exemplary in nature and various additional components can be present that have not necessarily been depicted in FIG. 3 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

The system or apparatus can include various components coupled to instrumentation or equipment that is within the utility compartment of the composite mandrel. For example, data including pressure, temperature, composition information, or a combination thereof, can pass through a fiber optic or wire cable junction within the composite mandrel en route to a receiver above-surface, or can be sent from instrumentation within the mandrel to an above-surface receiver, where the data can then be processed, displayed, and stored. In some embodiments, It is also to be recognized that the disclosed composite mandrel can also directly or indirectly affect the various downhole or subterranean equipment and tools. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 3.

EXAMPLES

Various embodiments of the present invention can be better understood by reference to the following Examples which are offered by way of illustration. The present invention is not limited to the Examples given herein.

Example 1. 3D-Printing of Mold

Figure 4A:
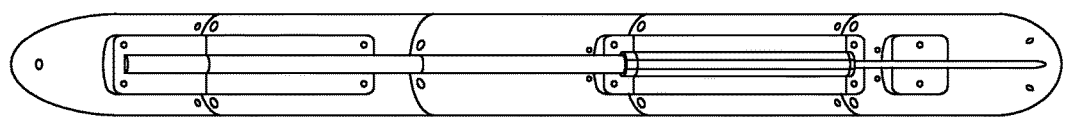
FIG. 4A illustrates a CAD image showing the inside of a mold, in accordance with various embodiments.
Figure 4B:
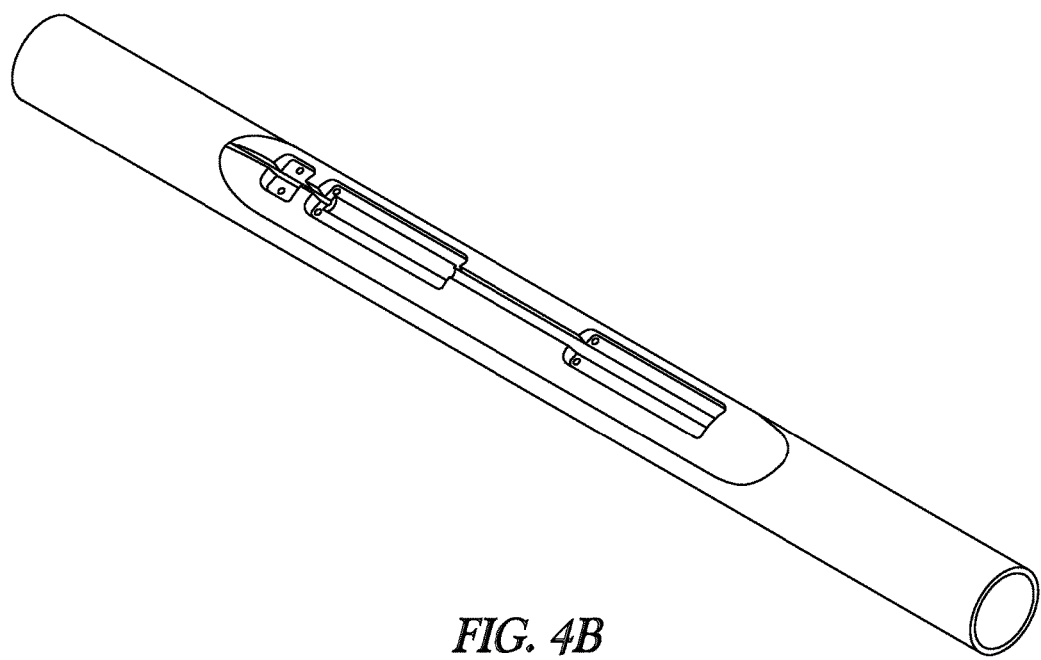
FIG. 4B illustrates a CAD image showing a composite mandrel, in accordance with various embodiments.
Figure 4C:
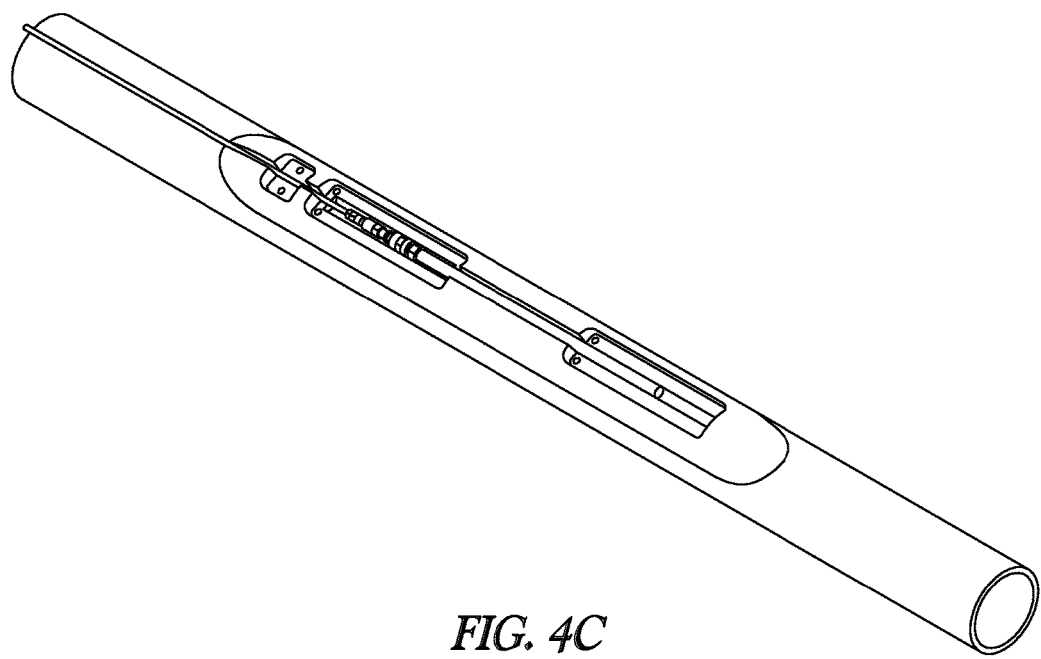
FIG. 4C illustrates a CAD image showing a composite mandrel, in accordance with various embodiments.

A mold having dimensions of 53 inches long, 5 inches wide, and 3 inches high was formed using a 3D-printing process. A CAD image showing the inside of the mold is illustrated in FIG. 4A. The mold was formed from a transparent UV-curable material, allowing the curable resin to be visualized when filling the mold. Due to the size of the printer platen (11"), the mold was printed as 5 parts and with the parts held to one another using duct tape. Each section of the mold had a fill port and breather holes. The CAD model was used to form images of the completed mandrel formed from the mold. A CAD image of the completed composite mandrel is illustrated in FIG. 4B. A CAD image of the completed mandrel with a fiber optic cable end termination disposed in the utility recess is illustrated in FIG. 4C.

Example 2. Formation of Composite Mandrel

Figure 5:
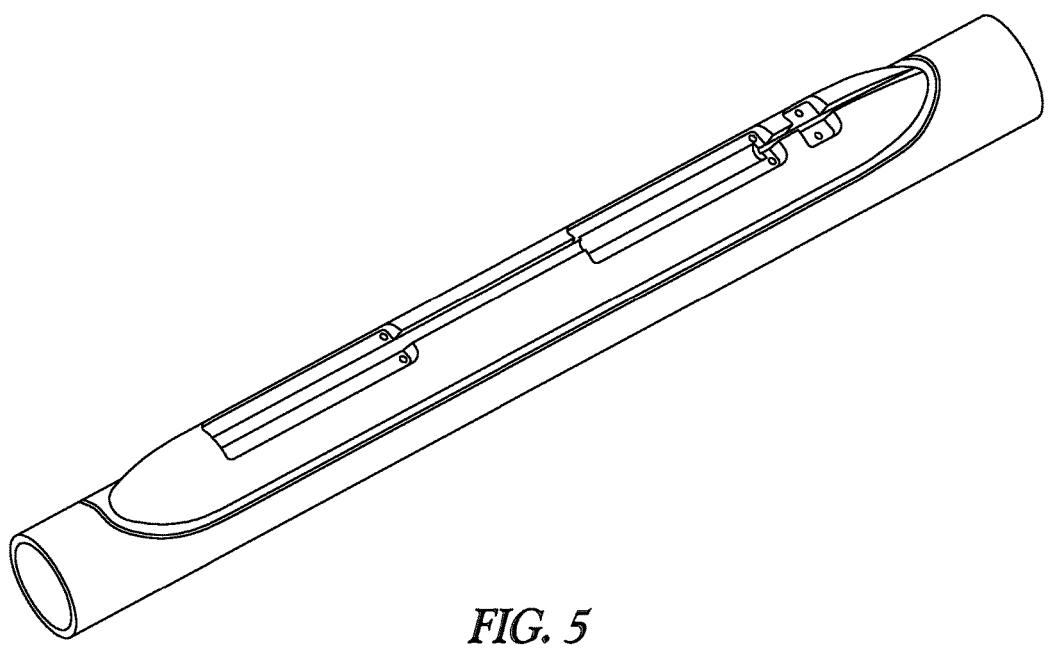
FIG. 5 illustrates a mold laid on casing and outlined, in accordance with various embodiments.
Figure 6:
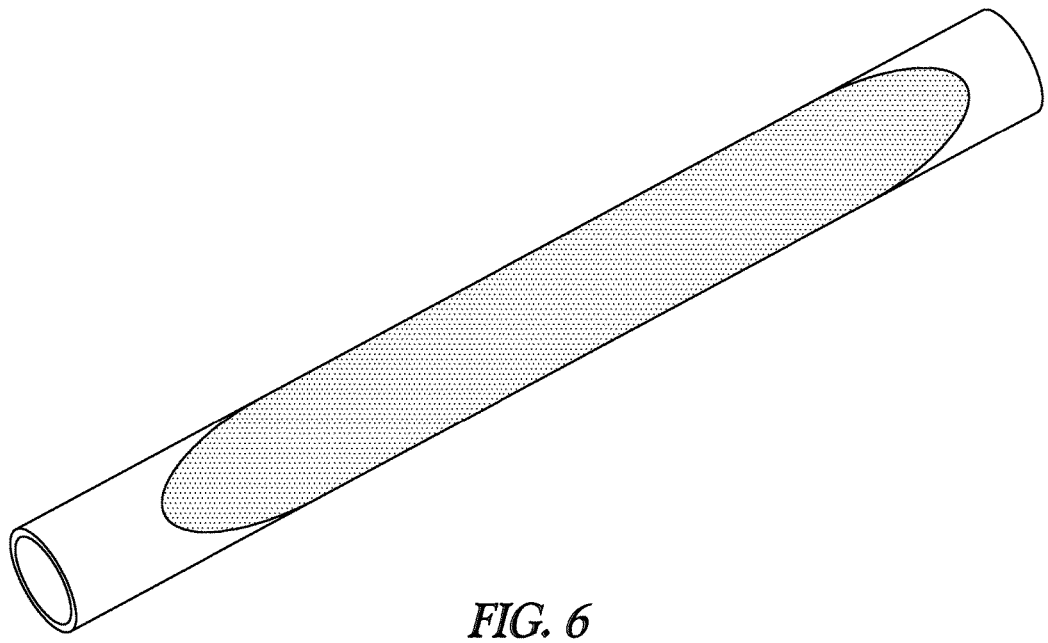
FIG. 6 illustrates a shot blasted casing, in accordance with various embodiments.
Figure 7:
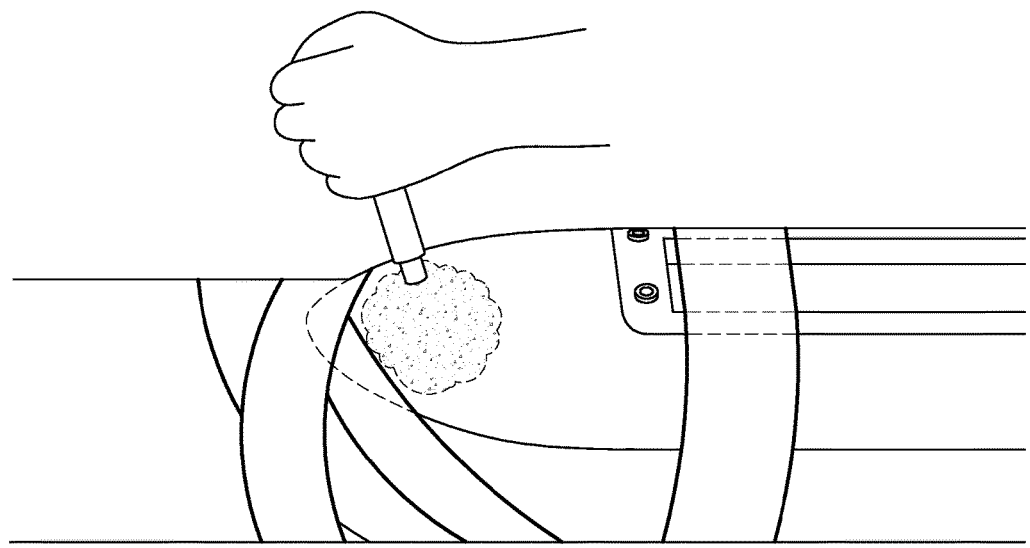
FIG. 7 illustrates a mold on a tubular being filled with a curable resin composition, in accordance with various embodiments.
Figure 8:
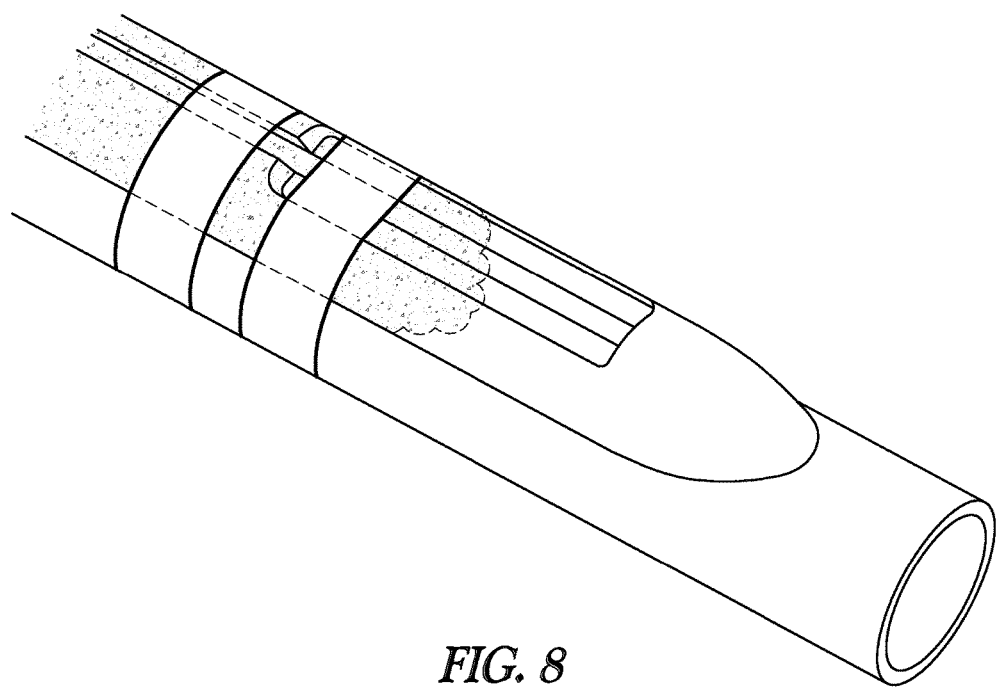
FIG. 8 illustrates a mold on a tubular being filled with a curable resin composition, in accordance with various embodiments.
Figure 9:
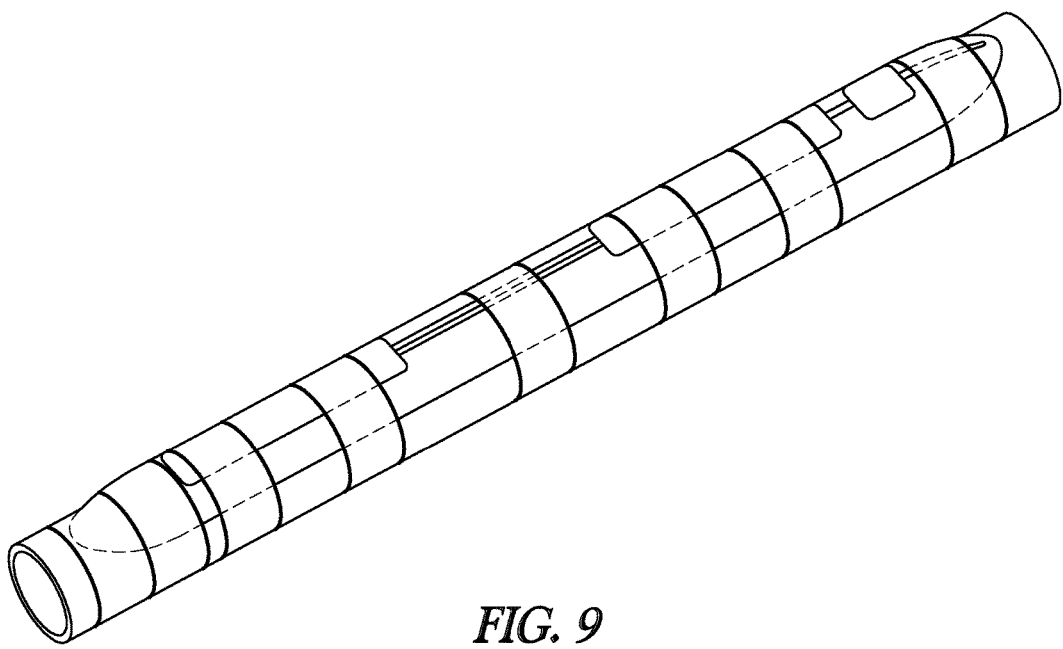
FIG. 9 illustrates a mold secured to the casing and filled with a curable resin composition, in accordance with various embodiments.
Figure 10:
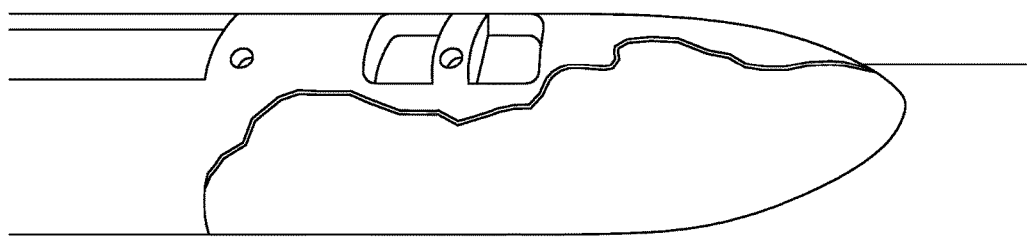
FIG. 10 illustrates mold removal from a cured resin, in accordance with various embodiments.
Figure 11:
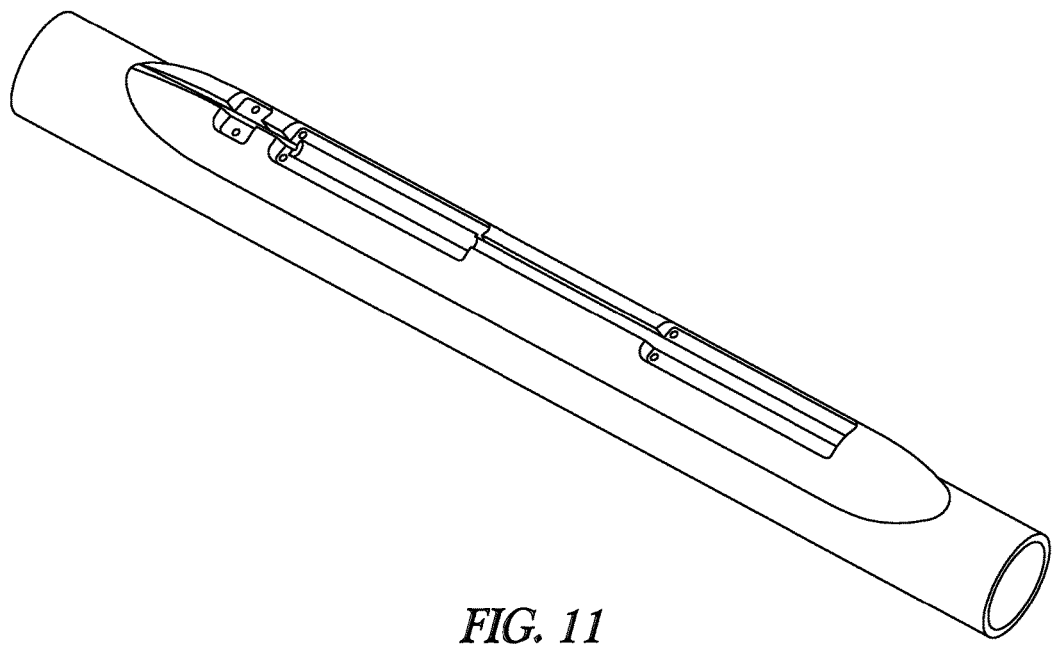
FIG. 11 illustrates a cured resin on a casing after mold removal, in accordance with various embodiments.
Figure 12:
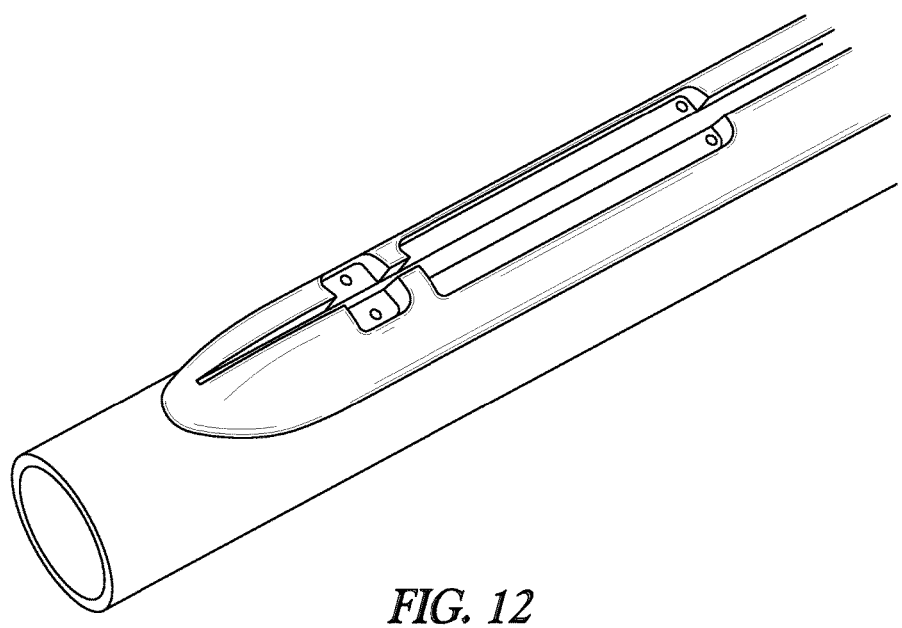
FIG. 12 illustrates a mold with a painted casing, in accordance with various embodiments.

First, the transparent mold was laid on casing and outlined in tape, as illustrated in FIG. 5. The mold was then removed, and the casing was shot blasted, as illustrated in FIG. 6. The mold was polished with car wax as a removal agent. The mold was placed on the casing and taped in place using duct tape. The mold included threaded inserts for transfer to the cured resin. A curable resin composition was injected slowly into the mold through injection holes, as illustrated in FIG. 7. The mold was filled with material, with air breather holes being taped over as they fill up with resin, as illustrated in FIG. 8. Additional breather holes were drilled where air was trapped, which were taped over with duct tape after resin filled the holes. The mold was left for 24 hours at room temperature as the curable resin cured exothermally, as illustrated in FIG. 9. The mold was removed (chipped away) from the cured resin, as illustrated in FIG. 10. The mold was completely removed, as illustrated in FIG. 11. The cured resin and tubular were cleaned and the casing was painted, as illustrated in FIG. 12.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of forming a composite mandrel for use in a subterranean formation, the method comprising:

securing an elongated mold to at least a portion of an exterior surface of a rigid tubular to form a cavity between the mold and the exterior surface of the rigid tubular, the elongated mold comprising a recessed portion, the cavity extending longitudinally along the tubular;

filling the cavity with a curable resin composition;

curing the curable resin composition to provide a cured resin comprising a utility recess corresponding to the recessed portion, to form the composite mandrel comprising the tubular and the cured resin.

Embodiment 2 provides the method of Embodiment 1, wherein the rigid tubular is a drill pipe, a casing, a production tubing, or a combination thereof.

Embodiment 3 provides the method of any one of Embodiments 1-2, wherein the exterior surface of the tubular contacted with the mold comprises an area of increased roughness.

Embodiment 4 provides the method of any one of Embodiments 1-3, further comprising roughening the exterior surface of the tubular before securing the mold to the exterior surface of the tubular.

Embodiment 5 provides the method of any one of Embodiments 1-4, further comprising sand blasting the exterior surface of the tubular before securing the mold to the exterior surface of the tubular.

Embodiment 6 provides the method of any one of Embodiments 1-5, wherein the mold comprises a polymer, a metal, and combinations thereof.

Embodiment 7 provides the method of any one of Embodiments 1-6, wherein the mold is at least one of a 3D-printed mold, a machined mold, a cast mold, a vacuum-formed mold, or a combination thereof.

Embodiment 8 provides the method of any one of Embodiments 1-7, further comprising forming the mold before securing the mold to the exterior surface of the tubular.

Embodiment 9 provides the method of claim 8, wherein forming the mold comprises 3D-printing the mold, machining the mold, casting the mold, vacuum-forming the mold, or a combination thereof.

Embodiment 10 provides the method of any one of Embodiments 8-9, wherein forming the mold comprises 3D-printing the mold.

Embodiment 11 provides the method of any one of Embodiments 1-10, further comprising reusing the mold to perform the method more than one time.

Embodiment 12 provides the method of any one of Embodiments 1-11, wherein securing the mold comprises at least one of strapping and taping the mold to the exterior surface of the tubular.

Embodiment 13 provides the method of any one of Embodiments 1-12, wherein the cavity formed by securing the elongated mold to the exterior surface of the rigid tubular is a single contiguous cavity.

Embodiment 14 provides the method of any one of Embodiments 1-13, wherein the utility recess is sufficient to accommodate a cable splice, a cable splice housing, a cable termination, instrumentation, or a combination thereof.

Embodiment 15 provides the method of any one of Embodiments 1-14, wherein the utility recess is sufficient to accommodate a fiber optic splice, a fiber optic splice housing, a fiber optic end termination, a racetrack splice, an in-line splice, a pressure gauge or sensor, a temperature gauge or sensor, a composition analyzer, a sound detector, nuclear magnetic resonance (NMR) equipment, or a combination thereof.

Embodiment 16 provides the method of any one of Embodiments 1-15, wherein the cured resin comprises one or more access orifices that comprise an orifice leading from the utility recess to space exterior surface to the mandrel, an orifice leading from interior space of the tubular to the utility recess, or a combination thereof.

Embodiment 17 provides the method of any one of Embodiments 1-16, wherein the cavity is substantially longitudinally symmetric along a line that is perpendicular to a central axis of the tubular.

Embodiment 18 provides the method of any one of Embodiments 1-17, wherein the cavity is substantially laterally symmetric along a line that is parallel to a central axis of the tubular.

Embodiment 19 provides the method of any one of Embodiments 1-18, wherein the cavity comprises a midsection and two tapered longitudinal ends.

Embodiment 20 provides the method of Embodiment 19, wherein the midsection comprises at least part of the utility recess.

Embodiment 21 provides the method of any one of Embodiments 19-20, wherein the longitudinal ends of the cavity have a tapered thickness.

Embodiment 22 provides the method of any one of Embodiments 19-21, wherein the longitudinal ends of the cavity have a tapered width.

Embodiment 23 provides the method of any one of Embodiments 19-22, wherein a length of the cavity is about 2 to about 1,000 times a width of the midsection of the cavity.

Embodiment 24 provides the method of any one of Embodiments 19-23, wherein a length of the cavity is about 5 to about 20 times a width of the midsection of the cavity.

Embodiment 25 provides the method of any one of Embodiments 19-24, wherein a length of the cavity is about 2 to about 1,000 times a thickness of the midsection of the cavity.

Embodiment 26 provides the method of any one of Embodiments 19-25, wherein a length of the cavity is about 10 to about 30 times a thickness of the midsection of the cavity.

Embodiment 27 provides the method of any one of Embodiments 1-26, wherein a width of the midsection of the cavity is about 1% to about 50% of a circumference of the tubular.

Embodiment 28 provides the method of any one of Embodiments 1-27, wherein a width of the midsection of the cavity is about 10% to about 40% of a circumference of the tubular.

Embodiment 29 provides the method of any one of Embodiments 1-28, wherein filling the cavity with the curable resin composition comprises injecting the curable resin composition into the cavity.

Embodiment 30 provides the method of any one of Embodiments 1-29, wherein the curable resin composition comprises a thermosetting resin, a thermoplastic resin, or a combination thereof.

Embodiment 31 provides the method of any one of Embodiments 1-30, wherein the curable resin composition comprises at least one of an alkyd resin, a urea/aldehyde resin, a melamine/aldehyde resin, a phenolic resin, a novolac resin, a resol resin, an epoxy resin, a polyimide resin, a polyurethane resin, a silicone resin, a furan-based resin, a polyamide resin, a polycarbonate resin, and a polycarbamate resin.

Embodiment 32 provides the method of any one of Embodiments 1-31, wherein the curable resin composition comprises a curing agent.

Embodiment 33 provides the method of any one of Embodiments 1-32, wherein the curable resin composition comprises a curing agent that is hexamethylenetriamine (HMTA).

Embodiment 34 provides the method of any one of Embodiments 1-33, wherein the curable resin composition comprises a ceramic.

Embodiment 35 provides the method of any one of Embodiments 34, wherein the ceramic comprises ceramic particles.

Embodiment 36 provides the method of any one of Embodiments 1-35, wherein the curable resin composition comprises carbon fibers.

Embodiment 37 provides the method of any one of Embodiments 1-36, wherein the curable resin composition comprises a ceramic and carbon fiber blend.

Embodiment 38 provides the method of any one of Embodiments 1-37, wherein the curable resin composition comprises titanium.

Embodiment 39 provides the method of any one of Embodiments 1-38, wherein the curable resin composition comprises epoxy resin, carbon fibers, titanium, and ceramic.

Embodiment 40 provides the method of any one of Embodiments 1-39, wherein the curable resin composition comprises a novolac resin having the following structure:

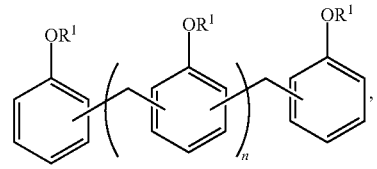

wherein
at each occurrence the phenyl groups are independently further substituted or unsubstituted;
at each occurrence, $R^1$ is independently selected from the group consisting of —H, -L-OH,

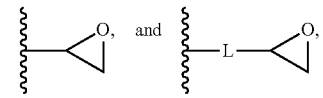

at each occurrence, L is independently a substituted or unsubstituted $(C_0-C_{50})$hydrocarbylene optionally interrupted by 0, 1, 2, or 3 groups chosen from —S—, —O—, substituted or unsubstituted —NH—, —$(CH_2$—$O)_m$—, and (—$CH_2$—$CH_2$—$O)_m$—, wherein m is about 1 to about 1,000, and n is about 0 to about 1,000,000.

Embodiment 41 provides the method of Embodiment 40, wherein the phenyl groups are further unsubstituted.

Embodiment 42 provides the method of any one of Embodiments 40-41, wherein at each occurrence, L is independently a $(C_1-C_{10})$alkylene.

Embodiment 43 provides the method of any one of Embodiments 1-42, wherein the curing comprises curing at ambient temperature.

Embodiment 44 provides the method of any one of Embodiments 1-43, wherein the curing comprises curing until the cured resin reaches a hardness of at least 50 Durometer.

Embodiment 45 provides the method of any one of Embodiments 1-44, wherein the curing comprises curing until the cured resin reaches a hardness of at least 80 Durometer.

Embodiment 46 provides the method of any one of Embodiments 1-45, wherein the cured resin is bonded to the tubular.

Embodiment 47 provides the method of any one of Embodiments 1-46, further comprising placing fasteners into the cured resin to secure the cured resin to the exterior surface of the tubular.

Embodiment 48 provides the method of any one of Embodiments 1-47, further comprising removing the mold from the exterior surface of the tubular and from the cured resin after curing the curable resin composition.

Embodiment 49 provides a composite mandrel formed by the method of any one of Embodiments 1-48.

Embodiment 50 provides a method of treating a subterranean formation, comprising placing the composite mandrel of Embodiment 49 in the subterranean formation.

Embodiment 51 provides a method of forming a composite mandrel for use in a subterranean formation, the method comprising:

forming an elongated mold comprising a recessed portion, the forming comprising 3D-printing;

securing the elongated mold to at least a portion of an exterior surface of a rigid tubular to form a cavity between the mold and the exterior surface of the rigid tubular, the cavity extending longitudinally along the tubular and comprising a midsection and two tapered longitudinal ends, wherein a length of the cavity is about 5 to 20 times a width of the midsection of the cavity, wherein a width of the midsection of the cavity is about 10% to about 40% of a circumference of the tubular;

filling the cavity with a curable resin composition;

curing the curable resin composition to provide a cured resin comprising a utility recess corresponding to the recessed portion, to form the composite mandrel comprising the tubular and the cured resin, wherein the utility recess is sufficient to accommodate a cable splice, a cable splice housing, a cable termination, instrumentation, or a combination thereof.

Embodiment 52 provides a composite mandrel for use in a subterranean formation, the composite mandrel comprising:

a rigid tubular; and a cured resin bonded to at least a portion of an exterior surface of the rigid tubular, wherein the cured resin is elongated and extends longitudinally along the tubular, the cured resin comprising a utility recess sufficient to accommodate a cable splice, a cable splice housing, a cable termination, instrumentation, or a combination thereof.

Embodiment 53 provides a system comprising:

a composite mandrel disposed in a subterranean formation, the composite mandrel comprising a rigid tubular; and a cured resin bonded to the rigid tubular, wherein the cured resin is elongated and extends longitudinally along the tubular, the cured resin comprising a utility recess; and a cable splice, a cable splice housing, a cable termination, a cable termination housing, instrumentation, or a combination thereof, disposed within the utility recess.

Embodiment 54 provides the system of Embodiment 53, further comprising a pump configured to pump a composition through the tubular in the subterranean formation.

Embodiment 55 provides the method, apparatus, or system of any one or any combination of Embodiments 1-54 optionally configured such that all elements or options recited are available to use or select from.

What is claimed is:

1. A method of forming a composite mandrel for use in a subterranean formation, comprising:

obtaining an elongated mold comprising a recessed portion;

securing the elongated mold to at least a portion of an exterior surface of a rigid tubular to form a cavity between the elongated mold and the exterior surface of the rigid tubular, the cavity extending longitudinally along the rigid tubular;

filling the cavity with a curable resin composition; and curing the curable resin composition to provide a cured resin comprising a utility recess corresponding to the recessed portion, to form the composite mandrel comprising the rigid tubular and the cured resin.

2. The method of claim 1, wherein the rigid tubular is a drill pipe, a casing, a production tubing, or a combination thereof, and wherein the elongated mold comprises a polymer, a metal, or a combination thereof.

3. The method of claim 1, further comprising roughening the exterior surface of the rigid tubular before securing the elongated mold to the exterior surface of the rigid tubular.

4. The method of claim 1, wherein the elongated mold is at least one of a 3D-printed mold, a machined mold, a cast mold, a vacuum-formed mold, or a combination thereof.

5. The method of claim 1, wherein the elongated mold is formed by 3D-printing, machining, casting, vacuum-forming, or a combination thereof.

6. The method of claim 1, wherein the utility recess is sufficient to accommodate a fiber optic splice, a fiber optic splice housing, a fiber optic end termination, a racetrack splice, an in-line splice, a pressure gauge or sensor, a temperature gauge or sensor, a composition analyzer, a sound detector, nuclear magnetic resonance (NMR) equipment, or any combination thereof.

7. The method of claim 1, wherein the cured resin comprises one or more access orifices that comprise an orifice leading from the utility recess to space exterior surface to the mandrel, an orifice leading from interior space of the rigid tubular to the utility recess, or a combination thereof.

8. The method of claim 1, wherein the cavity comprises a midsection and two tapered longitudinal ends, wherein a length of the cavity is about 5 times to about 20 times a width of the midsection of the cavity, and wherein a length of the cavity is about 10 times to about 30 times a thickness of the midsection of the cavity.

9. The method of claim 1, wherein a width of the midsection of the cavity is about 10% to about 40% of a circumference of the rigid tubular.

10. The method of claim 1, wherein the curable resin composition comprises at least one of an alkyd resin, a urea/aldehyde resin, a melamine/aldehyde resin, a phenolic resin, a novolac resin, a resol resin, an epoxy resin, a polyimide resin, a polyurethane resin, a silicone resin, a furan-based resin, a polyamide resin, a polycarbonate resin, a polycarbamate resin, or any combination thereof.

11. The method of claim 1, wherein the curable resin composition comprises a curing agent that is hexamethylenetriamine (HMTA).

12. The method of claim 1, wherein the curable resin composition comprises ceramic particles.

13. The method of claim 1, wherein the curable resin composition comprises a ceramic and carbon fiber blend.

14. The method of claim 1, wherein the curable resin composition comprises epoxy resin, carbon fibers, titanium, and ceramic.

15. The method of claim 1, wherein the curing comprises curing until the cured resin reaches a hardness of at least 80 Durometer.

16. The method of claim 1, further comprising placing fasteners into the cured resin to secure the cured resin to the exterior surface of the rigid tubular.

17. The method of claim 1, wherein the curable resin composition comprises a novolac resin having the following structure:

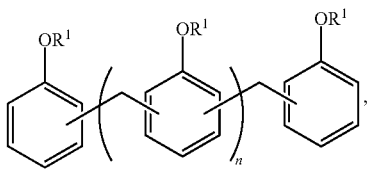

wherein:
at each occurrence the phenyl groups are independently further substituted or unsubstituted;
at each occurrence, $R^1$ is independently selected from the group consisting of —H, -L-OH,

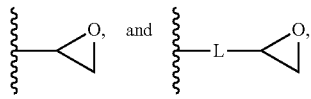

at each occurrence, L is independently a substituted or unsubstituted $(C_0$-$C_{50})$hydrocarbylene optionally interrupted by 0, 1, 2, or 3 groups chosen from —S—, —O—, substituted or unsubstituted —NH—, —$(CH_2$—$O)_m$—, and (—$CH_2$—$CH_2$—$O)_m$—, wherein m is 1 to about 1,000, and
n is 0 to about 1,000,000.

18. The method of claim 17, wherein the phenyl groups are further unsubstituted, and wherein at each occurrence, L is independently a $(C_1$-$C_{10})$alkylene.

19. A method of forming a composite mandrel for use in a subterranean formation, comprising:
forming an elongated mold comprising a recessed portion, the forming comprising 3D-printing;
securing the elongated mold to at least a portion of an exterior surface of a rigid tubular to form a cavity between the elongated mold and the exterior surface of the rigid tubular, the cavity extending longitudinally along the rigid tubular and comprising a midsection and two tapered longitudinal ends, wherein a length of the cavity is about 5 times to about 20 times a width of the midsection of the cavity, wherein a width of the midsection of the cavity is about 10% to about 40% of a circumference of the rigid tubular;
filling the cavity with a curable resin composition; and
curing the curable resin composition to provide a cured resin comprising a utility recess corresponding to the recessed portion, to form the composite mandrel comprising the rigid tubular and the cured resin, wherein the utility recess is sufficient to accommodate a cable splice, a cable splice housing, a cable termination, instrumentation, or a combination thereof.

20. A composite mandrel for use in a subterranean formation, comprising:
a rigid tubular; and
a cured resin
prepared from a curable resin and
bonded to at least a portion of an exterior surface of the rigid tubular,
wherein
the cured resin is elongated and extends longitudinally along the rigid tubular, the cured resin comprising a utility recess sufficient to accommodate a cable splice, a cable splice housing, a cable termination, instrumentation, or a combination thereof and
the cured resin was obtained by
obtaining an elongated mold comprising a recessed portion for providing the utility recess,
securing the elongated mold to the portion of the exterior surface of the rigid tubular,
filling the elongated mold with the curable resin, and
curing the curable resin in the elongated mold, to yield the cured resin.

* * * * *